(12) United States Patent
Warren et al.

(10) Patent No.: US 9,751,090 B2
(45) Date of Patent: Sep. 5, 2017

(54) METHODS FOR CLEANING PRECIPITATORS

(71) Applicant: US Nitro Blasting & Environmental, LLC, Kevil, KY (US)

(72) Inventors: Brian P. Warren, Broughton, IL (US); Philip F. Warren, Broughton, IL (US); Larry R. Massie, Worthington, KY (US)

(*) Notice: Subject to any disclaimer, the term of this patent is extended or adjusted under 35 U.S.C. 154(b) by 54 days.

(21) Appl. No.: 14/727,372

(22) Filed: Jun. 1, 2015

(65) Prior Publication Data

US 2016/0346789 A1    Dec. 1, 2016

(51) Int. Cl.
| | |
|---|---|
| *B03C 3/74* | (2006.01) |
| *B08B 7/00* | (2006.01) |
| *B01D 53/32* | (2006.01) |
| *B03C 3/76* | (2006.01) |

(52) U.S. Cl.
CPC .............. *B03C 3/74* (2013.01); *B01D 53/32* (2013.01); *B03C 3/76* (2013.01); *B08B 7/0007* (2013.01); *B03C 2201/32* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,089,702 A | * | 5/1978 | Enoksson | B08B 7/0007 102/302 |
| 4,313,767 A | * | 2/1982 | Bemis | B08B 5/02 134/1 |
| 5,056,587 A | | 10/1991 | Jones et al. | |
| 5,180,554 A | * | 1/1993 | Yamaguchi | B01D 5/0084 252/181.4 |
| 5,769,034 A | * | 6/1998 | Zilka | B08B 7/0007 122/379 |
| 6,321,690 B1 | * | 11/2001 | Zilka | B08B 7/0007 122/379 |
| 6,630,032 B2 | * | 10/2003 | Carmi | B08B 9/08 134/1 |
| 6,644,201 B2 | * | 11/2003 | Zilka | B08B 7/0007 102/302 |
| 6,755,156 B1 | * | 6/2004 | Zilka | B08B 7/0007 102/302 |
| 6,935,281 B2 | * | 8/2005 | Ruegg | F27D 25/006 122/379 |
| 7,011,047 B2 | | 3/2006 | Aarnio et al. | |

(Continued)

FOREIGN PATENT DOCUMENTS

CN    202460339 U    10/2012

OTHER PUBLICATIONS

International Search Report and Written Opinion, dated Aug. 29, 2016, for co-pending International application No. PCT/US2016/035226 (8 pgs).

*Primary Examiner* — Duane Smith
*Assistant Examiner* — Sonji Turner

(57) ABSTRACT

A method for cleaning a precipitator having a hopper defining an interior space and a drain valve is provided. The method includes inserting an explosive device into the interior space defined within the hopper via the drain valve, while the precipitator remains on-line. The method also includes detonating the explosive device to cause particulate matter contained therein to loosen for removal through the drain valve.

18 Claims, 3 Drawing Sheets

(56) References Cited

U.S. PATENT DOCUMENTS

| | | | |
|---|---|---|---|
| 7,104,223 B2* | 9/2006 | Bussing | B08B 7/0007 122/379 |
| 7,267,134 B2 | 9/2007 | Hochstein, Jr. et al. | |
| 7,395,760 B2* | 7/2008 | Zilka | B08B 7/0007 102/302 |
| 2001/0007247 A1* | 7/2001 | Zilka | B08B 7/0007 122/379 |
| 2002/0029792 A1* | 3/2002 | Carmi | B08B 7/0007 134/21 |
| 2002/0112638 A1* | 8/2002 | Zilka | B08B 7/0007 102/307 |
| 2004/0107858 A1* | 6/2004 | Zilka | B08B 7/0007 102/302 |
| 2004/0216698 A1* | 11/2004 | Zilka | B08B 7/0007 122/379 |
| 2005/0109231 A1* | 5/2005 | Bussing | B08B 7/0007 102/302 |
| 2006/0027191 A1* | 2/2006 | Zilka | B08B 7/0007 122/379 |
| 2008/0264357 A1* | 10/2008 | Liljegren | B08B 7/0007 122/379 |
| 2013/0056034 A1 | 3/2013 | Zhang et al. | |
| 2013/0104929 A1 | 5/2013 | Zhang et al. | |
| 2015/0375274 A1* | 12/2015 | Flury | F22B 37/54 134/19 |

* cited by examiner

METHODS FOR CLEANING PRECIPITATORS

BACKGROUND

The field of this disclosure relates generally to power generation and, more particularly, to methods for cleaning a precipitator of an industrial system.

During operation, many known industrial systems such as, for example, fuel-burning systems, generate a gaseous byproduct or exhaust gases that are eventually channeled towards the atmosphere. Known exhaust gases contain combustion products including, but not limited to, carbon, fly ash, carbon monoxide, water, hydrogen, nitrogen, sulfur, chlorine, arsenic, selenium, and/or mercury. It is generally required that particulate matter suspended in the gaseous byproduct be removed before the gaseous byproduct is exhausted into the ambient.

Emissions from industrial systems are subject to government regulation. As such, at least some known industrial systems include a pollution control system that facilitates reducing particulate matter and/or constituents from the exhaust gas flow prior to the exhaust gases being discharged. At least some known pollution control systems include a precipitator that extracts particulate matter from the gaseous byproduct. Within at least some known precipitators, extracted particulate matter is stored in the precipitator for subsequent removal from the precipitator, while other known precipitators include mechanisms, such as rappers and hopper-evacuation systems, that attempt to remove the collected particulate from the precipitator. However, regardless of the type of precipitator used, particulate may accumulate on the collecting surfaces over time.

It may be difficult to remove particulate matter that has adhered to the components of the precipitator, and quite often, to clean such components effectively, the unit must be removed from service. Because known industrial systems do not commonly own redundant precipitators, removing the precipitator to clean it may require a system outage before a time-consuming and costly cleaning can be performed. It would be useful, therefore, to provide an effective way to clean accumulated particulate matter from inside a precipitator while the precipitator is on-line.

BRIEF DESCRIPTION

In one aspect, a method for cleaning a precipitator having a hopper defining an interior space and a drain valve is provided. The method includes inserting an explosive device into the interior space defined within the hopper via the drain valve, while the precipitator remains on-line. The method also includes detonating the explosive device to cause particulate matter contained therein to loosen for removal through the drain valve.

In another aspect, a method for cleaning a precipitator having a hopper defining an interior space and a drain valve is provided. The method includes providing an apparatus including a pole and an explosive device coupled to the pole, and inserting the pole through the drain valve of the hopper to place the explosive device in the interior space. The method also includes detonating the explosive device while the pole is inserted through the drain valve and the explosive device is disposed within the interior space.

In another aspect, a method for cleaning a precipitator is provided. The precipitator includes a particle extraction assembly with a plurality cells each including an energized extraction device that extracts particulate matter from exhaust gases of a fuel-burning apparatus. The method includes selecting one of the cells for cleaning. The method also includes detonating an explosive device in the selected cell while the extraction device of the selected cell is de-energized, and while the extraction device of at least one remaining cell is energized, to facilitate cleaning the selected cell while the precipitator remains on-line.

DETAILED DESCRIPTION

The following detailed description illustrates methods for cleaning precipitators by way of example and not by way of limitation. The description enables one of ordinary skill in the art to practice the methods, and the description describes several embodiments of the methods, including what is presently believed to be the best mode of carrying them out. The methods are described herein as being applied to a preferred embodiment, namely a precipitator of an industrial system. However, it is contemplated that the methods have general application to cleaning a broad range of components in a broad range of systems aside from precipitators in industrial systems.

Figure 1:
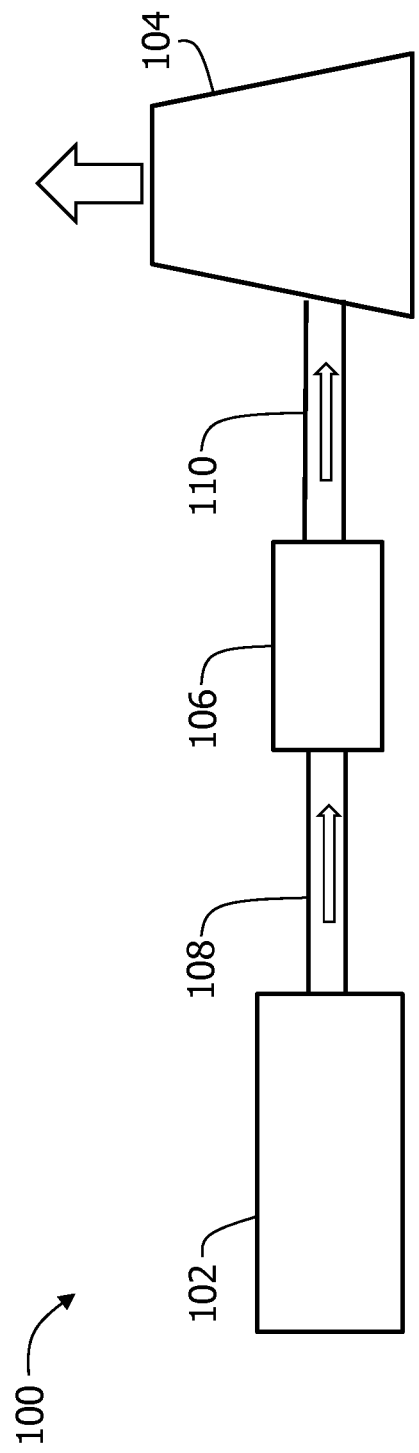
FIG. 1 is a schematic illustration of an exemplary industrial system.

FIG. 1 is a schematic illustration of an exemplary industrial system 100. In the exemplary embodiment, industrial system 100 is a power plant (e.g., a coal-fired power plant) that includes a fuel-burning apparatus 102 (e.g., a boiler) that generates a gaseous byproduct (i.e., an exhaust flow). Industrial system 100 also includes an exhaust stack 104 that is coupled in flow communication with fuel-burning apparatus 102 across a precipitator 106 via a plurality of ducts, such as a precipitator inlet duct 108 and a precipitator outlet duct 110, for example. In other embodiments, industrial system 100 may have any suitable configuration of operating components coupled together that facilitates any suitable industrial processes to be performed and that includes a precipitator 106. For example, in some embodiments, industrial system 100 may not include fuel-burning apparatus 102, but rather may include an apparatus that generates a gaseous byproduct without burning fuel.

Figure 2:
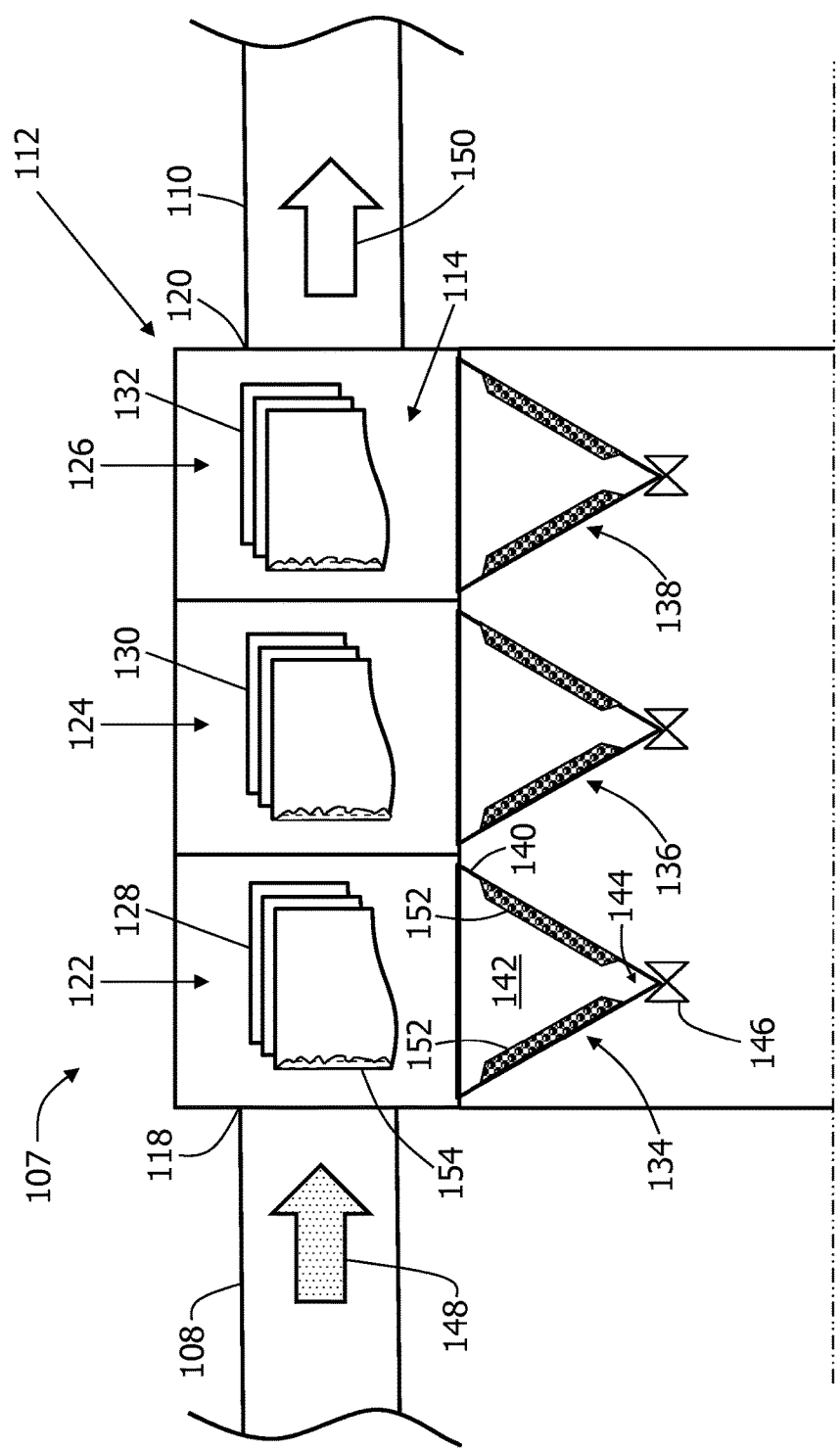
FIG. 2 is a schematic illustration of an exemplary precipitator that may be used with the industrial system shown in FIG. 1.

FIG. 2 is a schematic illustration of an exemplary precipitator 107 that may be used with industrial system 100 (shown in FIG. 1). In the exemplary embodiment, precipitator 107 includes a housing 112 and a particle extraction assembly 114 contained at least partially within housing 112. Housing 112 includes an inlet 118 coupled in flow communication with fuel-burning apparatus 102 via precipitator inlet duct 108, and an outlet 120 coupled in flow communication with exhaust stack 104 via precipitator outlet duct 110. Alternatively, housing 112 may include any number of inlets and/or outlets coupled in flow communication with any suitable number of fuel-burning apparatuses and/or exhaust stacks via any suitable number of ducts coupled together in any suitable orientation.

In the exemplary embodiment, particle extraction assembly 114 includes a plurality of cells, namely a first cell 122, a second cell 124, and a third cell 126, for example. First cell 122 includes a first extraction device 128, second cell 124 includes a second extraction device 130, and third cell 126 includes a third extraction device 132. Each extraction device 128, 130, 132 generates an electric field that facilitates electro-statically extracting entrained particulate matter from exhaust gases. For example, in some embodiments, each extraction device 128, 130, and/or 132 may include at least one electrically-chargeable electrode (not shown), and at least one electrically-chargeable collector plate (not shown) that work in combination to generate the electric field to cause particulate matter to collect on the collector plate. Alternatively, particle extraction assembly 114 may include any suitable number of cells, and each cell may have any suitable extraction device that facilitates extracting entrained particulate matter from exhaust gases in any suitable manner (e.g., at least one extraction device of particle extraction assembly 114 may not electro-statically extract particulate matter from a gas, but rather may extract particulate matter from a gas using mechanical and/or non-electrical methods).

In the exemplary embodiment, cells 122, 124, 126 are sequentially-arranged between inlet 118 and outlet 120 along housing 112 such that gas flowing through housing 112 from inlet 118 to outlet 120 initially flows over first extraction device 128, then past second extraction device 130, and then over third extraction device 132. Moreover, in the exemplary embodiment, each extraction device 128, 130, and/or 132 is independently energizeable relative to the other extraction devices 128, 130, and/or 132 such that, when one extraction device 128, 130, and/or 132 is selectively de-energized, particle extraction assembly 114 can remain operative. For example, in some embodiments, when first extraction device 128 is selectively de-energized, second and third extraction devices 130 and 132 may remain energized. In another embodiment, when first and second extraction devices 128 and 130 are de-energized, third extraction device 132 remains energized. In other embodiments, cells 122, 124, and 126 of particle extraction assembly 114 are not sequentially-arranged (e.g., gas flowing over first extraction device 128 may not flow over second extraction device 130 before being discharged from housing 112 through outlet 120). Alternatively, extraction devices 128, 130, and/or 132 may not be independently energizeable (e.g., extraction devices 128, 130, and/or 132 may be energized and de-energized in unison only).

In the exemplary embodiment, first cell 122 has a first hopper 134, second cell 124 has a second hopper 136, and third cell 126 has a third hopper 138. Each hopper 134, 136, and 138 is situated beneath a respective extraction device 128, 130, and 132 within a respective cell 122, 124, and 126. Moreover, each hopper 134, 136, and 138 has a generally funnel-shaped arrangement of walls 140 that surround an interior space 142 defined therein and a neck 144. In addition, each hopper 134, 136, and 138 also includes a drain valve 146 that may be selectively opened to enable access to interior space 142 through neck 144. In other embodiments, each hopper 134, 136, and/or 138 may have any suitable shaped interior space defined by walls 140, and/or each hopper 134, 136, and/or 138 may have any number of drain valves 146 arranged in any suitable location that provides selective access to interior space 142.

When industrial system 100 is on-line, fuel-burning apparatus 102 generates exhaust gases 148 in which particulate matter is suspended. Exhaust gases 148 are channeled through precipitator inlet duct 108 and into housing 112 via inlet 118. With first extraction device 128, second extraction device 130, and third extraction device 132 of particle extraction assembly 114 energized, exhaust gases 148 flow initially through first extraction device 128, then through second extraction device 130, and subsequently through third extraction device 132. As exhaust gases 148 flow through the electric field generated within each extraction device 128, 130, and/or 132, particulate matter entrained in exhaust gases 148 becomes charged and electro-statically collects on extraction devices 128, 130, and/or 132. Substantially particle-free gas 150 is then discharged from housing 112 through outlet 120 towards exhaust stack 104 (shown in FIG. 1) via precipitator outlet duct 110.

As particulate matter is extracted from exhaust gases 148, eventually the particulate matter falls from each extraction device 128, 130, and/or 132 into a respective hopper 134, 136, 138. Drain valves 146 permit selective and/or periodic removal of the particulate matter from hoppers 134, 136, and/or 138. For example, with respect to first cell 122, particulate matter extracted via first extraction device 128 falls into first hopper 134, and selectively opening drain valve 146 of first hopper 134 permits removal of particulate matter stored within first hopper 134. With respect to cells 124 and 126, particulate matter may be extracted in a similar manner as described for first cell 122.

Over time, as precipitator 107 is operated, some particulate matter may undesirably adhere to walls 140 on hoppers 134, 136 and/or 138 such that, even after opening drain valves 146 to release the stored particulate matter, a build-up 152 of particulate matter may remain on walls 140. In addition, particulate matter may undesirably build up on extraction devices 128, 130, and/or 132 (e.g., to the electrodes and/or the collection plates thereof), forming a build-up 154 of particulate matter on portions of extraction devices 128, 130, and/or 132. Such build-up 152 and/or 154 can adversely affect the performance of precipitator 107, and it is desirable to periodically remove build-up 152 and/or 154 to enhance operation of precipitator 107.

Because the electric field generated within each extraction device 128, 130, and/or 132 may interfere with the cleaning operation, it is desirable to only clean each cell 122, 124, and/or 126 of precipitator 107 when the respective extraction device 128, 130, and/or 132 is de-energized (i.e., each respective cell 122, 124, and/or 126 of precipitator 107 should be made inoperative when that particular cell 122, 124, and/or 126 is being cleaned). That said, it is undesirable to have all extraction devices 128, 130, and 132 de-energized at the same time because doing so would render precipitator 107 inoperative, which would in turn necessitate taking industrial system 100 off-line. Because extraction devices 128, 130, and 132 are independently energizeable, however, any of extraction device 128, 130, and/or 132 may be selectively de-energized for cleaning, while the remaining other extraction devices 128, 130, and 132 of precipitator 107 remain energized and continue to extract particulate matter from exhaust gases 148. As such, precipitator 107 may be cleaned while it remains in operation, thereby enabling industrial system 100 to remain on-line while precipitator 107 is cleaned, and this facilitates maximizing the efficiency and operation of industrial system 100.

Figure 3:
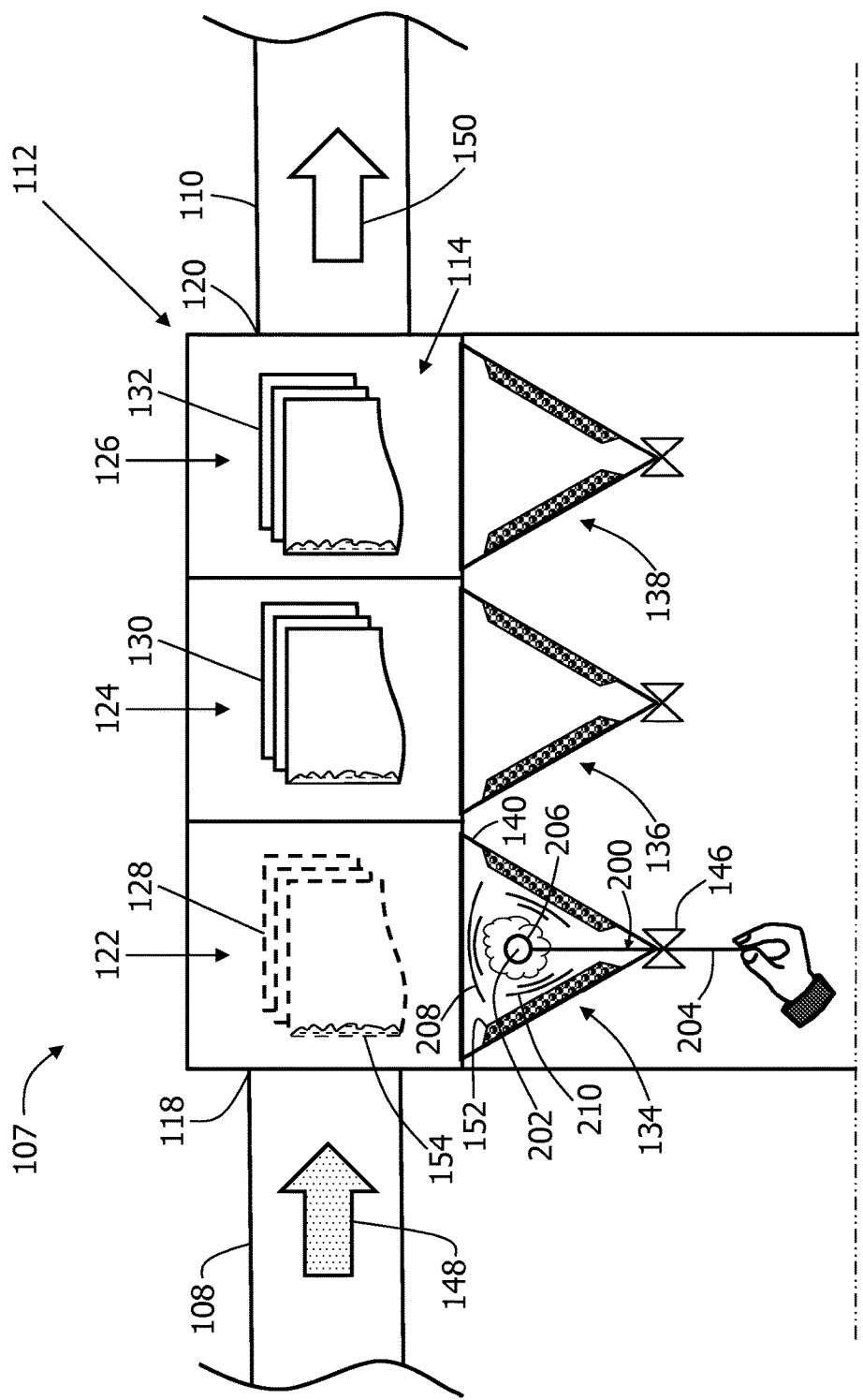
FIG. 3 is a schematic illustration of the precipitator shown in FIG. 2 and during a cleaning operation.

FIG. 3 is a schematic illustration of precipitator 107 during an exemplary cleaning operation. In the exemplary embodiment, first cell 122 is being cleaned and, hence, first extraction device 128 has been de-energized (as indicated by its representation in dashed lines) such that first cell 122 is inoperative for extracting particulate matter from exhaust gases 148. Nonetheless, second cell 124 and third cell 126 remain operative for extracting particulate matter from exhaust gases 148 in the exemplary embodiment. Optionally, in other embodiments, second extraction device 130 and/or third extraction device 132 may be de-energized for cleaning second cell 124 and/or third cell 126, respectively, while first extraction device 128 remains energized such that first cell 122 is operative for extracting particulate matter from exhaust gases 148 while second cell 124 and/or third cell 126 are inoperative.

In the exemplary embodiment, an apparatus 200 is provided for cleaning first cell 122, and apparatus 200 includes an explosive device 202 coupled to a non-conductive pole 204. In some embodiments, explosive device 202 includes a preassembled charge (e.g., a 40 gn detonating cord) coupled to a blasting cap. In other embodiments, explosive device 202 may be configured in any suitable manner (e.g., may have any suitable size, or power) that facilitates enabling apparatus 200 to function as described herein.

By way of man or machine, pole 204 is then inserted through drain valve 146 to introduce explosive device 202 into interior space 142 of first hopper 134. In some embodiments, it is desirable to maintain a predetermined distance (e.g., no less than about six feet) between explosive device 202 and first extraction device 128 to facilitate preventing damage to first extraction device 128 upon detonation of explosive device 202. Alternatively, explosive device 202 may be placed in any suitable manner that facilitates enabling apparatus 200 to function as described herein.

Because first extraction device 128 is de-energized upon introducing explosive device 202 into interior space 142 of first hopper 134, any premature detonation of explosive device 202 that may have otherwise been caused by the electric field of first extraction device 128 when energized is inhibited. Additionally, apparatus 200 may further include a protective layer 206 (e.g., a moistened layer, such as a wet blanket) for covering explosive device 202 prior to introducing explosive device 202 into interior space 142 of first hopper 134, thereby inhibiting any premature detonation of explosive device 202 as a result of the elevated temperature within interior space 142.

When explosive device 202 is placed within interior space 142, explosive device 202 is detonated using a suitable detonation mechanism. The blast from detonating explosive device 202 generates a pressure wave that radiates outward from explosive device 202, with a first wave segment 208 propagating toward first extraction device 128, and a second wave segment 210 propagating toward walls 140 of first hopper 134. First wave segment 208 facilitates agitating build-up 154 of particulate matter and, thereby, causing build-up 154 to be become dislodged from first extraction device 128. Second wave segment 210 facilitates agitating build-up 152 of particulate matter and, thereby, causing build-up 152 to become dislodged from walls 140 of first hopper 134. Notably, second wave segment 210 subsequently reflects upward toward first extraction device 128 from walls 140 as a result of walls 140 having a generally funnel-shaped arrangement, such that the reflected second wave segment 210 supplements first wave segment 208 in agitating and dislodging build-up 154 from first extraction device 128. While dislodged build-up 152 and/or 154 is likely to become airborne within interior space 142 and/or housing 112, the airborne build-up 152 and/or 154 is permitted to fall into interior space 142 of first hopper 134 due at least in part to first extraction device 128 being de-energized, as opposed to the airborne build-up 152 and/or 154 being electro-statically recollected on first extraction device 128 had first extraction device 128 instead been energized during cleaning.

After detonating explosive device 202, pole 204 is removed from drain valve 146, and the dislodged build-up 152 and/or 154 is removed from interior space 142 for subsequent disposal. Suitably, the cleaning operation set forth above may be repeated (e.g., a new explosive device 202 may later be inserted into interior space 142 and detonated) until a desired cleanliness standard for first cell 122 is satisfied. Once the desired cleanliness standard for first cell 122 is satisfied, drain valve 146 of first hopper 134 is to be closed, and first extraction device 128 is to be re-energized to again make first cell 134 operative for extracting particulate matter from exhaust gases 148. Suitably, second cell 124 and/or third cell 126 may subsequently be made inoperative for cleaning in the same manner that first cell 134 was cleaned above.

In some embodiments, a characteristic of substantially particle-free gas 150 flowing toward, through, and/or out of exhaust stack 104 may be monitored (e.g., in real-time) by a suitable data collection instrument before, during, and/or after explosive device 202 is detonated. For example, in some embodiments, the opacity data and/or the flow data of substantially particle-free gas 150 in exhaust stack 104 may be monitored by a suitable opacity monitoring system. Such data may be utilized to identify any apparent fluctuations in quality (e.g., opacity spikes) of substantially particle-free gas 150, which may in turn facilitate determining an appropriate number of cleaning operations that should be repeated for each cell 122, 124, and/or 126 of precipitator 107 (i.e., an appropriate number of explosive devices 202 that should be detonated back-to-back within each cell 122, 124, and/or 126), and/or determining an appropriate size (e.g., power) and/or placement of explosive devices 202 in future cleaning operations. Additionally, in some embodiments, any apparent fluctuations in quality of substantially particle-free gas 150 (e.g., any apparent opacity spikes in substantially particle-free gas 150) that are identified from the data may be utilized to establish an appropriate time interval between back-to-back detonations in an effort to not exceed a predetermined quality standard for substantially particle-free gas 150 such as, for example, a maximum opacity standard of substantially particle-free gas 150.

The methods described herein facilitate cleaning particulate matter build-up from inside a precipitator. In this manner, the methods described herein facilitate maintaining proper functioning of the precipitator and, hence, facilitate reducing a need to replace the precipitator and its individual components over time, thereby enhancing the useful life of the precipitator. As such, the methods described herein facilitate improving the overall efficiency of, and reducing the overall cost associated with, operating the industrial system of which the precipitator is a part.

Exemplary embodiments of methods for cleaning a precipitator are described above in detail. The methods described herein are not limited to the specific embodiments described herein, but rather, parts of the methods may be utilized independently and separately from other parts described herein. For example, the methods described herein may have other applications not limited to practice with industrial systems, as described herein. Rather, the methods described herein can be implemented and utilized in connection with various applications.

While the invention has been described in terms of various specific embodiments, those skilled in the art will recognize that the invention can be practiced with modification within the spirit and scope of the claims.

What is claimed is:

1. A method for cleaning a precipitator having a hopper defining an interior space and a drain valve, said method comprising:

inserting an explosive device into the interior space defined within the hopper via the drain valve, while the precipitator remains on-line;

detonating the explosive device to cause particulate matter contained therein to loosen for removal through the drain valve; and monitoring a characteristic of a gas discharged from the precipitator in real-time when detonating the explosive device.

2. A method in accordance with claim 1, further comprising inserting the explosive device through the drain valve using a pole, and detonating the explosive device while the pole is inserted through the drain valve.

3. A method in accordance with claim 1, further comprising monitoring an opacity characteristic of the gas.

4. A method in accordance with claim 1, further comprising wrapping the explosive device with a moistened protective layer before inserting the explosive device into the interior space of the hopper.

5. A method in accordance with claim 1, further comprising inserting the explosive device into the hopper of a precipitator cell having a de-energized extraction device.

6. A method in accordance with claim 5, further comprising maintaining a distance of at least about six feet between the explosive device and the de-energized extraction device when detonating the explosive device.

7. A method for cleaning a precipitator having a hopper defining an interior space and a drain valve, said method comprising:

providing an apparatus including a pole and an explosive device coupled to the pole;

inserting the pole through the drain valve of the hopper to place the explosive device in the interior space;

detonating the explosive device while the pole is inserted through the drain valve and the explosive device is disposed within the interior space; and monitoring a characteristic of a gas discharged from the precipitator in real-time when detonating the explosive device.

8. A method in accordance with claim 7, further comprising monitoring an opacity characteristic of the gas.

9. A method in accordance with claim 7, further comprising wrapping the explosive device with a moistened protective layer before inserting the explosive device into the interior space of the hopper.

10. A method in accordance with claim 7, further comprising inserting the explosive device into the hopper of a precipitator cell having a de-energized extraction device.

11. A method in accordance with claim 10, further comprising maintaining a distance of at least about six feet between the explosive device and the de-energized extraction device when detonating the explosive device.

12. A method for cleaning a precipitator including a particle extraction assembly with a plurality cells each including an energized extraction device that extracts particulate matter from exhaust gases of a fuel-burning apparatus, said method comprising:

selecting one of the cells for cleaning; and detonating an explosive device in the selected cell while the extraction device of the selected cell is de-energized, and while the extraction device of at least one remaining cell is energized, to facilitate cleaning the selected cell while the precipitator remains on-line.

13. A method in accordance with claim 12, further comprising detonating the explosive device in a hopper of the selected cell.

14. A method in accordance with claim 13, further comprising inserting the explosive device into the hopper via a drain valve of the hopper.

15. A method in accordance with claim 14, further comprising maintaining a distance of at least about six feet between the explosive device and the de-energized extraction device when detonating the explosive device.

16. A method in accordance with claim 12, further comprising monitoring a characteristic of a gas discharged from the precipitator in real-time when detonating the explosive device.

17. A method in accordance with claim 16, further comprising monitoring an opacity characteristic of the gas.

18. A method in accordance with claim 7, further comprising:

removing the pole from the drain valve after detonating the explosive device;

inserting a second apparatus including a second pole and a second explosive device coupled to the second pole through the drain valve to place the second explosive device in the interior space; and detonating the second explosive device while the second pole is inserted through the drain valve and the second explosive device is disposed within the interior space.

* * * * *